(12) United States Patent
Amano et al.

(10) Patent No.: US 9,538,414 B2
(45) Date of Patent: Jan. 3, 2017

(54) TRANSMISSION CONTROL METHOD AND NODE

(71) Applicant: FUJITSU LIMITED, Kawasaki-shi, Kanagawa (JP)

(72) Inventors: Mitsuharu Amano, Fukuoka (JP); Makoto Kawatoko, Onga (JP); Yasuhiro Kurogi, Fukuoka (JP); Takayuki Okamasu, Fukuoka (JP); Yayoi Nomura, Fukuoka (JP)

(73) Assignee: FUJITSU LIMITED, Kawasaki (JP)

( * ) Notice: Subject to any disclaimer, the term of this patent is extended or adjusted under 35 U.S.C. 154(b) by 93 days.

(21) Appl. No.: 14/299,743

(22) Filed: Jun. 9, 2014

(65) Prior Publication Data

US 2014/0286168 A1    Sep. 25, 2014

Related U.S. Application Data

(63) Continuation of application No. PCT/JP2011/079406, filed on Dec. 19, 2011.

(51) Int. Cl.
*H04W 28/02* (2009.01)
*H04B 7/15* (2006.01)
(Continued)

(52) U.S. Cl.
CPC ............ *H04W 28/021* (2013.01); *H04B 7/15* (2013.01); *H04L 45/306* (2013.01); *H04L 69/22* (2013.01);
(Continued)

(58) Field of Classification Search
CPC ........ H04W 4/22; H04W 84/18; H04W 40/30; H04W 28/021; H04L 69/22; H04L 45/306; H04B 7/15
See application file for complete search history.

(56) References Cited

U.S. PATENT DOCUMENTS

| 7,295,562 B1* | 11/2007 | Acharya | H04L 47/32 370/412 |
| 2005/0243782 A1* | 11/2005 | Sakoda | H04L 47/10 370/338 |

(Continued)

FOREIGN PATENT DOCUMENTS

| JP | 2004-180131 | 6/2004 |
| JP | 2008-16990 A | 1/2008 |

(Continued)

OTHER PUBLICATIONS

Japanese Office Action mailed May 12, 2015 for corresponding Japanese Patent Application No. 2013-549979, with Partial English Translation, 4 pages.

(Continued)

*Primary Examiner* — Donald Mills
*Assistant Examiner* — Henry Baron
(74) *Attorney, Agent, or Firm* — Fujitsu Patent Center

(57) ABSTRACT

Each of the nodes included in an ad-hoc network determines whether an identifier indicative of high-priority data is included in data received from another node. When the identifier is included in the received data, each of the nodes determines whether the subject node is a device that relays the received data to a destination. When determining that the subject node is a device that relays the received data to the destination, each of the nodes transmits the received data to the destination. When determining that the subject node is not a device that relays the received data to the destination, each of the nodes suppresses data transmission to the nodes included in the ad-hoc network.

7 Claims, 14 Drawing Sheets

(51) Int. Cl.
    *H04W 84/18*     (2009.01)
    *H04W 4/22*     (2009.01)
    *H04W 40/30*     (2009.01)
    *H04L 12/725*     (2013.01)
    *H04L 29/06*     (2006.01)

(52) U.S. Cl.
    CPC ............... *H04W 4/22* (2013.01); *H04W 40/30* (2013.01); *H04W 84/18* (2013.01)

(56) References Cited

U.S. PATENT DOCUMENTS

| | | | |
|---|---|---|---|
| 2008/0310340 A1* | 12/2008 | Isozu | H04L 45/10 370/328 |
| 2009/0325480 A1 | 12/2009 | Ji et al. | |
| 2012/0079052 A1* | 3/2012 | Lutz | H04L 47/17 709/207 |
| 2012/0106552 A1 | 5/2012 | Iwao et al. | |

FOREIGN PATENT DOCUMENTS

| | | |
|---|---|---|
| JP | 2009-130859 | 6/2009 |
| JP | 2010-288023 | 12/2010 |
| JP | 2011-526466 A | 10/2011 |
| WO | 2011013165 | 2/2011 |

OTHER PUBLICATIONS

International Search Report, mailed in connection with PCT/JP2011/079406 and mailed Feb. 21, 2012.

\* cited by examiner

| GD | LD | PRIORITY |
|---|---|---|
| NODE X | NODE B | 1 |
| | NODE F | 2 |
| | NODE E | 3 |

TRANSMISSION CONTROL METHOD AND NODE

CROSS-REFERENCE TO RELATED APPLICATION

This application is a continuation of International Application No. PCT/JP2011/079406, filed on Dec. 19, 2011 and designating the U.S., the entire contents of which are incorporated herein by reference.

FIELD

The embodiments discussed herein are directed to a transmission control method and a node.

BACKGROUND

Conventionally, there is a known ad-hoc network using a proactive-type routing protocol that creates a path for each of nodes to autonomously conduct data communications, prior to data communications within the network.

Each of the nodes forming the ad-hoc network regularly exchanges with adjacent nodes messages including node information such as path information and link quality information. In addition, each of the nodes calculates communication quality of each path and, based on results of the calculation, creates a plurality of paths to the final destination and determines the optimum path. As described above, the ad-hoc network holds a plurality of paths for one destination, and thus even if the highest-quality path becomes disconnected, data can be delivered to the final destination by switching to another path to execute data transmission.

In the ad-hoc network, in the event of congestion, the frequency of occurrence of collisions becomes higher to increase the frequency of re-transmission. Accordingly, an increased amount of time is taken for data transmission/reception between nodes existing on the path from the transmission source node to the final destination, which causes a phenomenon that the data does not reach the final destination within an expected time. In the event of such a phenomenon, even emergency data with higher priority than normal data is not transmitted/received.

In recent years, there has been known a method for avoiding occurrence of congestion by specifying at the data transmission source a timing for data transmission at the opposed side to prevent collision of data transmitted from nodes. In addition, an upper limit is placed for each node on data transmission bandwidth capable of being occupied by a connection during data transmission, and when data is to be transmitted with a data transmission bandwidth beyond the upper limit, a priority connection capable of occupying the data transmission bandwidth is established for data transmission. In addition, there has been known a control technique for, while a priority connection is established, data transmission by other connections is temporarily interrupted, whereas emergency data with a higher priority can be transmitted by other connections.

Patent Literature 1: International Publication Pamphlet No. WO 2011/013165
Patent Literature 2: Japanese Laid-open Patent Publication No. 2004-180131
Patent Literature 3: Japanese Laid-open Patent Publication No. 2009-130859

However, even with the use of the conventional technique, there is a problem that emergency data with a higher priority is delayed or does not reach during congestion.

For example, the method for specifying a timing for data transmission is a technique for preventing occurrence of congestion, and thus in the event of congestion, not only emergency data but also normal data may be delayed or not reach the destination. In addition, according to the technique for transmitting emergency data even while a priority connection is established, the priority connection occupies the data transmission bandwidth to narrow the bandwidth for transmission of the emergency data. As a result, the emergency data may be delayed or not reach the destination, depending on the volume of the emergency data and the like.

SUMMARY

According to an aspect of the embodiments, a communication control method is executed by a first node included in an ad-hoc network. The communication control method includes determining whether an identifier indicative of high-priority data is included in data received from a second node included in the ad-hoc network; when the identifier is included in the received data, determining whether the first node is a device that relays the received data to a destination; and when it is determined that the first node is a device that relays the received data to the destination, transmitting the received data to the destination, whereas when it is determined that the first node is not a device that relays the received data to the destination, suppressing data transmission to nodes included in the ad-hoc network.

The object and advantages of the invention will be realized and attained by means of the elements and combinations particularly pointed out in the claims.

It is to be understood that both the foregoing general description and the following detailed description are exemplary and explanatory and are not restrictive of the invention.

DESCRIPTION OF EMBODIMENTS

Embodiments of a transmission control method and a node according to the present invention will be described below with reference to the drawings. However, the present invention is not limited to these embodiments.

[a] First Embodiment

Entire Configuration

Figure 1:
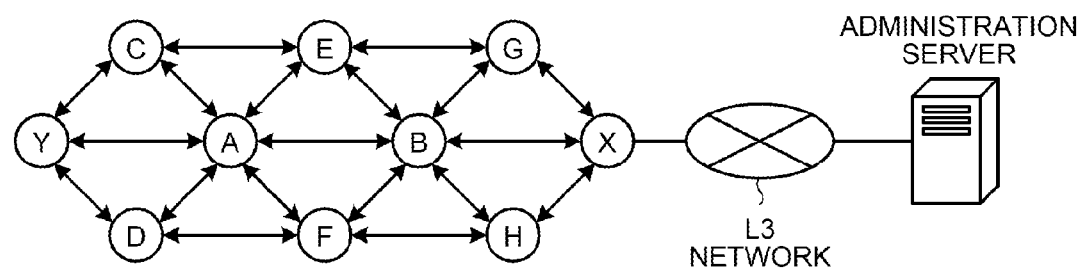
FIG. 1 is a diagram illustrating a configuration example of an entire wireless communication system according to a first embodiment.

FIG. 1 is a diagram illustrating an entire configuration example of a wireless communication system according to a first embodiment. As illustrated in FIG. 1, the wireless communication system includes nodes A, B, C, D, E, F, G, H, Y, X, and an administration server.

The nodes A, B, C, D, E, F, G, H, and Y are wireless communication devices connected to various meters, sensors, and others, and transmit sensor values to the administration server via the node X. The node X is a gateway device relaying between a wireless network and an L3 network. The administration server collects sensor values and others acquired by the nodes and manages the communication status of the nodes.

The wireless network illustrated in FIG. 1 is an ad-hoc network using a proactive-type routing protocol such as OLSR (Optimized Link State Routing). Each of the nodes regularly exchanges with adjacent nodes a HELLO message including node information such as path information and link quality information. In addition, each of the nodes calculates communication quality of paths, and creates a plurality of paths to the final destination and determines an optimum path, based on results of the calculations.

Figure 2:
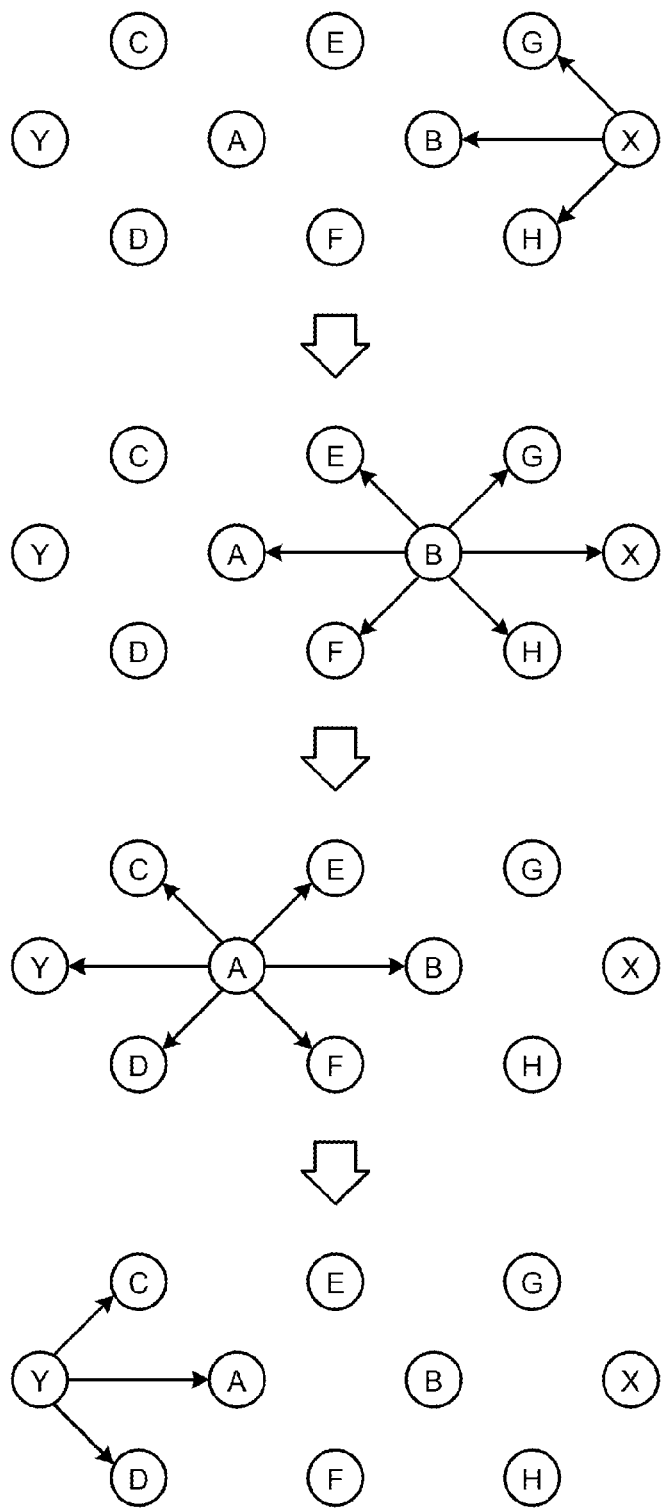
FIG. 2 is a diagram for describing a propagation example of a HELLO message.

Referring to FIG. 2, a specific example of transmission/reception of HELLO messages between the nodes will be described. As illustrated in FIG. 2, first, the node X transmits a HELLO message including path information and others of its device. Then, nodes positioned within a range capable of direct communications with the node X, that is, the adjacent nodes G, B, and H receive the HELLO message transmitted from the node X.

Next, the node B transmits a HELLO message including path information and others of its device. Then, the nodes A, E, F, G, H, and X adjacent to the node B receive the HELLO message transmitted from the node B. Similarly, each of the nodes G and H having received the HELLO message from the node X also transmits a HELLO message including path information and others of its device to its adjacent nodes. As a result, it is possible to exchange path information between the node G and the nodes adjacent to the node G.

Further, the node A having received the HELLO message from the node F transmits a HELLO message including path information and others of its device. The nodes B, C, D, E, F, and Y adjacent to the node A receive the HELLO message transmitted from the node A. Similarly, each of the nodes E and F transmits a HELLO message including path information and others of its device to its adjacent nodes.

Further, the node Y having received the HELLO message from the node A transmits a HELLO message including path information and others of its device. Then, the nodes A, C, and D adjacent to the node Y receive the HELLO message transmitted from the node Y. Similarly, each of the nodes C and D transmits a HELLO message including path information and others of its device to its adjacent nodes.

Accordingly, each of the nodes can exchange path information with adjacent nodes. In addition, each of the nodes acquires link quality and path weights indicative of the status of links with the adjacent nodes. Then, each of the nodes updates the order of selection and priority of the adjacent nodes, based on the link quality, magnitudes of path weights, and others, thereby to update the path information.

In another method, each of the nodes may measure radio field strength on receipt of a HELLO message and update path information according to results of the measurement. In addition, each of the nodes acquires a time when a HELLO message has been created and a time when the HELLO message has reached its device, from the header and the like of the HELLO message. Then, each of the nodes may update path information such that a higher priority is placed on a path with a shorter time between which the creation and arrival of the HELLO message.

As described above, each of the nodes learns path information by exchange of the HELLO messages, thereby to determine an optimum path and a redundant path. However, the node X is a device to receive data from the nodes and relay the same to the administration server. Thus, in many cases, there is a concentration of data transmission from each of the nodes to the node X in the wireless network, which causes congestion in the paths to the node X or at the node X. In the event of congestion, there may arise a phenomenon that emergency data with higher priority for control of sensors and the like do not reach the administration server.

Even in such a case, each of the nodes determines whether data received from a node included in the ad-hoc network is given an identifier indicative of higher-priority data. When the data is given the identifier, each of the nodes determines whether the node is a device to relay the received data to the destination. After that, when determining that the node is a device to relay the received data to the destination, each of the nodes transmits the received data to the destination, whereas when determining that the node is not a device to relay the received data to the destination, each of the nodes suppresses data transmission to the nodes.

As described above, the nodes positioned on the relay path relay emergency data to the destination, whereas the nodes not positioned on the relay path for the emergency node suppress a data transmission process to assure the path for the emergency data. As a result, regardless of whether or not there is congestion in the wireless network, it is possible to assure a bandwidth in which to transmit the emergency data and allow the emergency data to reach the destination even during the congestion.

Node Configuration

Subsequently, functional blocks of each of the nodes illustrated in FIG. 1 will be described. The nodes illustrated in FIG. 1 are identical in configuration, and thus each of the nodes is described here as node 10.

Figures 3, 4:
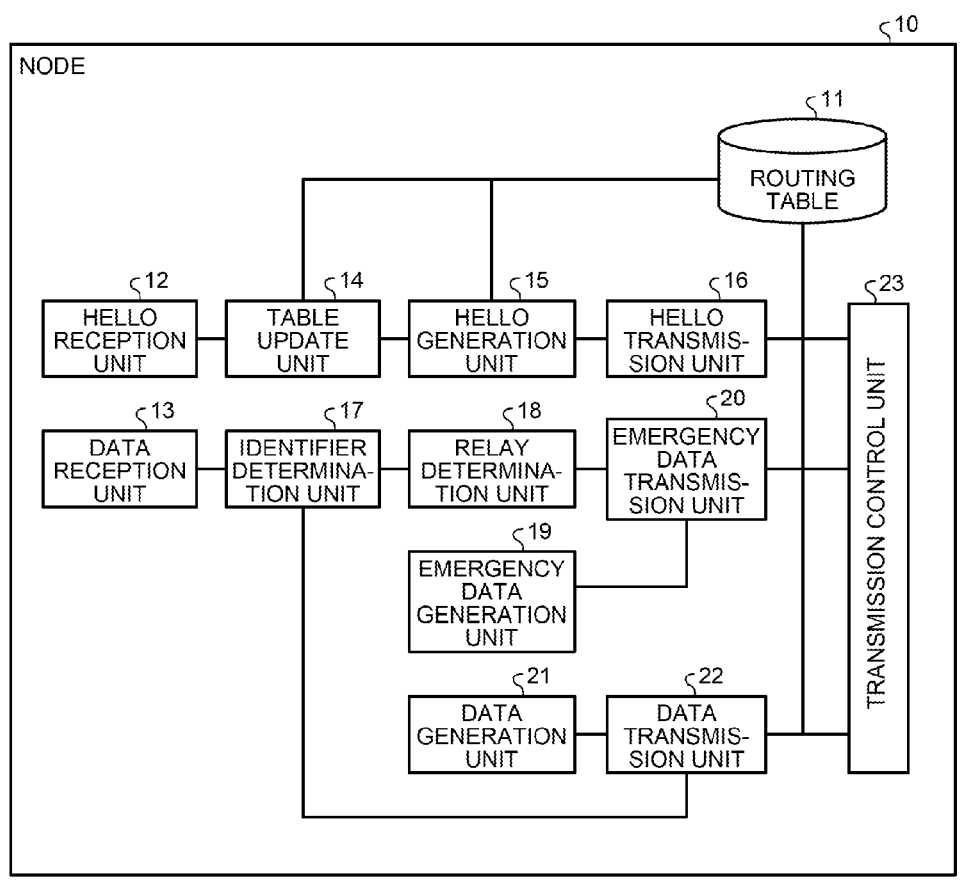
FIG. 3 is a functional block diagram illustrating a configuration of a node according to the first embodiment.
FIG. 4 is a diagram illustrating an example of information stored in a routing table.

FIG. 3 is a functional block diagram illustrating a configuration of a node according to the first embodiment. As illustrated in FIG. 3, the node 10 includes a routing table 11, a HELLO reception unit 12, a data reception unit 13, a table update unit 14, a HELLO generation unit 15, and a HELLO transmission unit 16. The node 10 further includes an identifier determination unit 17, a relay determination unit 18, an emergency data generation unit 19, an emergency data transmission unit 20, a data generation unit 21, a data transmission unit 22, and a transmission control unit 23. Each of the processing units is executed by a processor such as a CPU (central processing unit). The routing table 11 is provided in a storage device such as a memory.

The routing table 11 is a storage device configured to store path information. FIG. 4 is a diagram illustrating an example of information stored in the routing table. As illustrated in FIG. 4, the routing table 11 stores the information associated with "GD (global destination), LD (local destination), and priority." The "GD" is information indicative of a final destination of data, and, for example, may be an IP (Internet protocol) address or an MAC (media access control) address. The "LD" is information indicative of nodes adjacent to a transmission source of data, and, for example, may be an IP (Internet protocol) address or an MAC (media access control) address. The "priority" indicates order of priority for selection of relay destinations on data transmission.

In FIG. 4, for data with the final destination set to the node X, the adjacent nodes B, F, and E are specified as relay destinations in this order. Specifically, the node 10 specifies the node B as a relay destination of the data with the final destination set to the node X, and specifies the node F in the case of failure, congestion, or the like of the node B. In addition, the node 10 specifies the node E in the case of failure, congestion, or the like of the nodes and B and F.

In the example of FIG. 4, the routing table 11 includes associations among GD, LD, and priority, but the present invention is not limited to this. For example, the routing table 11 may store the number of hops to the GD, path quality weights indicative of quality of links with the LD, and the like.

The HELLO reception unit 12 is a processing unit that receives HELLO messages from adjacent nodes. Taken as an example the case where the node 10 is the node A illustrated in FIG. 1, the HELLO reception unit 12 regularly receives HELLO messages from the nodes B, C, D, E, F, and Y adjacent to the node A.

Figure 5:
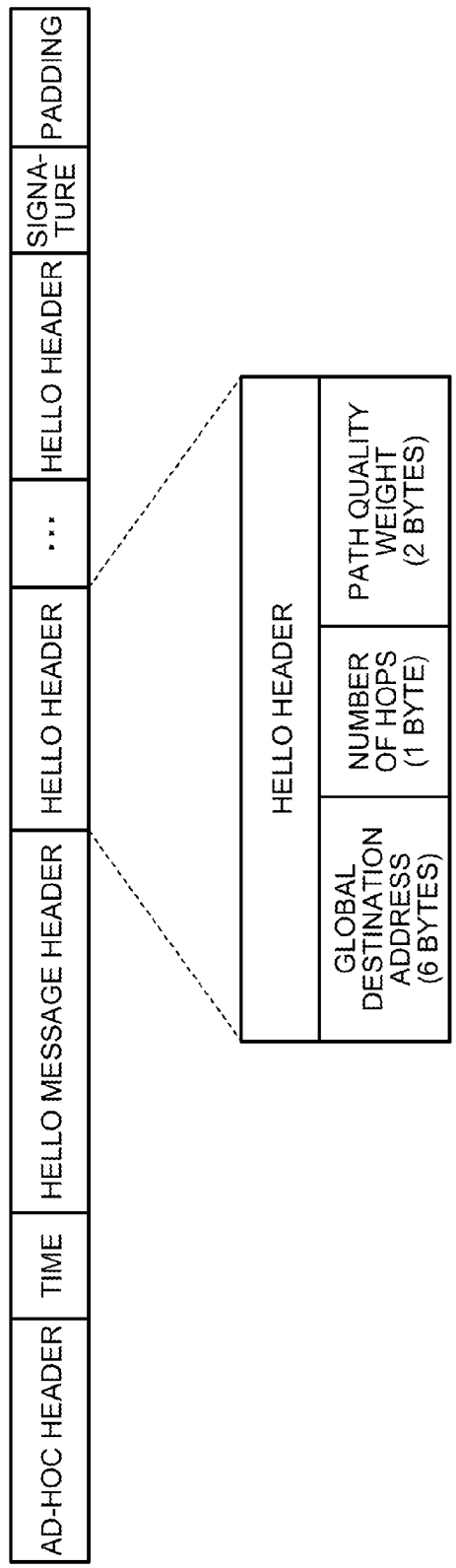
FIG. 5 is a diagram illustrating a format example of the HELLO message.

FIG. 5 is a diagram illustrating a format example of a HELLO message. As illustrated in FIG. 5, the HELLO message includes "ad-hoc header, time, HELLO message header, a plurality of HELLO headers, signature, and padding." The "ad-hoc header" indicates identification information of an ad-hoc frame. The "time" indicates time of transmission. The "HELLO message header" indicates information on adjacent nodes. The "HELLO headers" indicate path information held by the adjacent nodes, and include, for example, 6-byte "global destination address," 1-byte "number of hops," and 2-byte "path quality weight." The "global destination address" indicates address information of a node as final destination. The "number of hops" indicates the number of hops to the final destination. The "path quality weight" indicates quality of a path to the final destination, and may be arbitrarily set or may be expressed by a radio field strength or the like. The "signature" indicates signature information affixed to the HELLO message. The "padding" is information for adjusting the frame length of the HELLO message to a multiple number of 128 bits.

Figure 6:
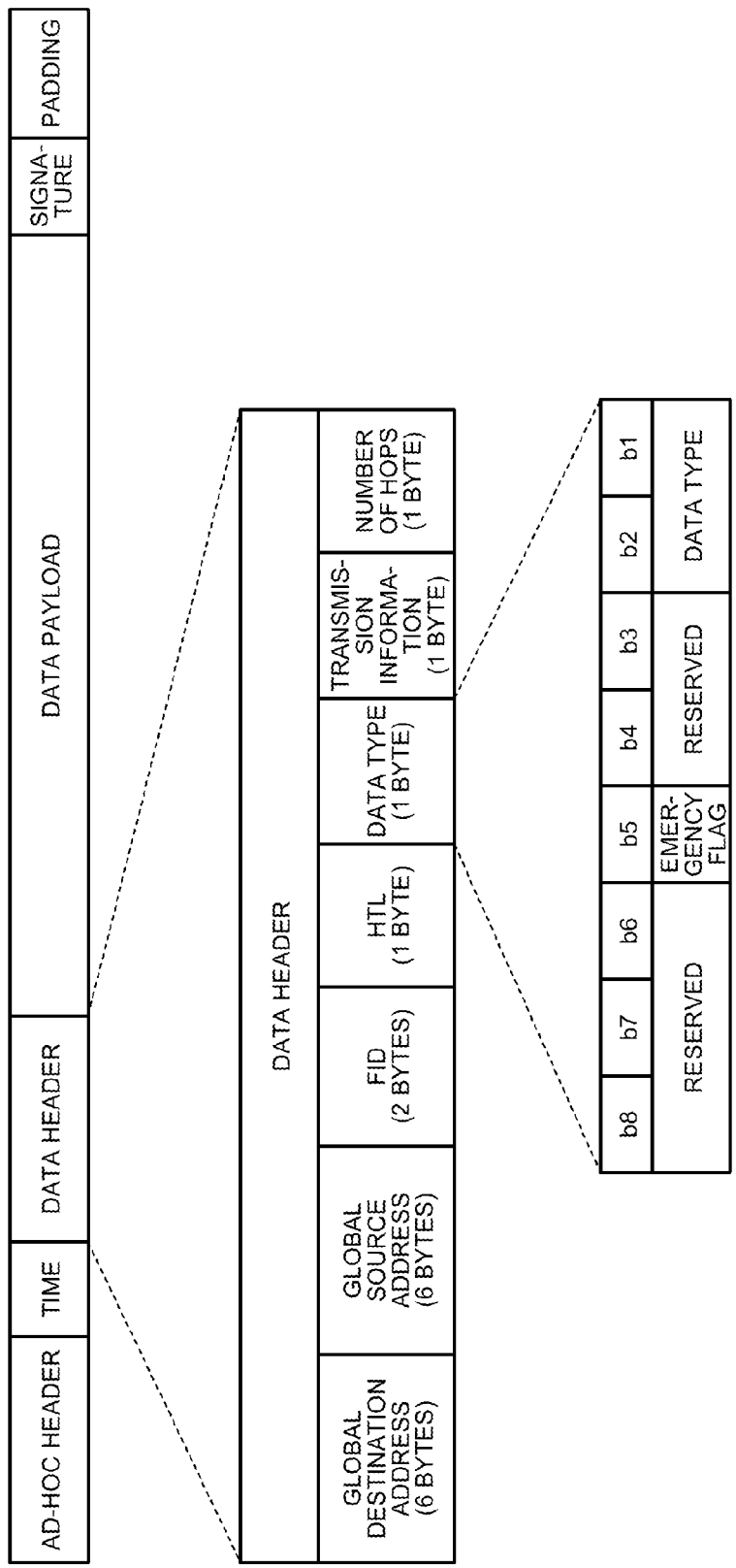
FIG. 6 is a diagram illustrating a format example of a data frame.

The data reception unit 13 is a processing unit that receives data frames from adjacent nodes. Here, descriptions will be given as to a data frame. FIG. 6 is a diagram illustrating a format example of a data frame. As illustrated in FIG. 6, the data frame includes "ad-hoc header, time, data header, data payload, signature, and padding."

The "ad-hoc header" indicates identification information of the ad-hoc frame. The "time" indicates time of transmission. The "data header" indicates detailed information of the data frame, and includes 6-byte "global destination address," 6-byte "global source address," and 2-byte "FID (frame ID)." Further, the "data header" includes 1-byte "HTL," 1-byte "data type," 1-byte "transfer information," and 1-byte "number of hops." The "global destination address" indicates address information of a node as final destination. The "global source address" indicates address information of a node as a generator of the data frame. The "FID" is an identifier for identifying the data frame. The "HTL" indicates the expiration date of the data frame. The "data type" has an emergency flag indicative of emergency data or normal data. When 1 is stored in the emergency flag, the data is emergency data, and when 0 is stored in the emergency flag, the data is normal data. The "transfer information" indicates transfer information such as bandwidth of a path and the like. The "number of hops" indicates the number of hops from the global source address. The "data payload" indicates data to be transmitted. The "signature" indicates signature information affixed to the data frame. The "padding" is information for adjusting the frame length of the data frame to a multiple number of 128 bits.

The table update unit 14 is a processing unit that updates the routing table 11 based on the path information in the HELLO message received by the HELLO reception unit 12. For example, the table update unit 14 extracts the LD from the ad-hoc header of the HELLO message, and extracts the GD, path weight, and number of hops from the HELLO headers, and updates the routing table based on these items.

Taking an example, the table update unit 14 holds the number of hops and the path weight with an association between the GD and the LD received from the HELLO message. Then, the table update unit 14 grasps the numbers of hops and the path quality in the case of passing through adjacent nodes (LD) in the path from its device to the destination (GD). After that, the table update unit 14 selects three LDs with smaller number of hops in the path to the GD, and sets priorities to the LDs in descending order of path quality, thereby updating the routing table.

The foregoing updating method is mere an example, and the present invention is not limited to this. In another example, the table update unit 14 extracts the time of transmission from each of the HELLO messages received from the adjacent nodes, and compares the time of transmission with the time of receipt of the HELLO message. Then, when there is a larger difference between the time of transmission and the time of receipt, the table update unit 14 may estimate that there is a higher possibility of occurrence of congestion or delay, and thus place a lower priority. When there is a smaller difference between the time of transmission and the time of receipt, the table update unit 14 may estimate that the transmission status is preferred, and thus place a higher priority.

The HELLO generation unit 15 is a processing unit that generates a HELLO message on a regular basis or according to an instructive operation from an administrator or the like. For example, the HELLO generation unit 15 reads path information from the routing table 11 for each of the adjacent nodes. Then, the HELLO generation unit 15 generates a HELLO message storing the path information and outputs the same to the transmission control unit 23. The HELLO generation unit 15 also generates a response message (ACK: ACKnowledge) to the HELLO message received by the HELLO reception unit 12, and outputs the same to the transmission control unit 23.

The HELLO transmission unit 16 is a processing unit that transmits a HELLO message or an ACK generated by the HELLO generation unit 15 to the destination. For example, when a HELLO message or an ACK response is input from the transmission control unit 23, the HELLO transmission unit 16 transmits the same to the destination according to the path information stored in the routing table 11.

The identifier determination unit 17 is a processing unit that determines whether the data frame received by the data reception unit 13 is given an identifier indicative of high-priority data. For example, the identifier determination unit 17 refers to the data header in the data frame received by the data reception unit 13 to determine whether the value of the emergency flag stored in the data type of the data header is 0 or 1. Then, when the stored value is 1, the identifier determination unit 17 determines that the received data frame is emergency data and outputs the same to the relay determination unit 18. Meanwhile, when the stored value is 0, the identifier determination unit 17 determines that the received data frame is normal data and outputs the same to the transmission control unit 23. The identifier determination unit 17 generates an ACK to the data frame received by the data reception unit 13, and outputs the same to the transmission control unit 23.

The relay determination unit 18 is a processing unit that determines whether the subject node as the node 10 is a device that relays emergency data. For example, the relay determination unit 18 extracts the global destination address (GD) and the local destination address (LD) from the ad-hoc header in the emergency data input from the identifier determination unit 17. Then, when the global destination address does not match the address information in the subject node but the local destination address matches the address information in the subject node, the relay determination unit 18 determines that the subject node is a device that relays emergency data. After that, the relay determination unit 18 outputs the emergency data and determination results to the transmission control unit 23.

The emergency data generation unit 19 is a processing unit that generates emergency data under instructions from the administrator or with a predetermined impetus. For example, when detecting that an abnormality has occurred in a sensor connected to the node 10, the emergency data generation unit 19 generates a data frame for emergency data in which abnormality information indicative of abnormality is stored in the data payload. In the data frame, the emergency data generation unit 19 also sets address information of the node X to the global destination address in the data header, and address information of the node 10 to the global source address, and sets 1 to the emergency flag. After that, the emergency data generation unit 19 stores 0 as the number of hops and the expiration date, and then outputs the generated emergency data to the transmission control unit 23.

The emergency data transmission unit 20 is a processing unit that transmits to the destination emergency data or an ACK input via the transmission control unit 23 from the relay determination unit 18 or the emergency data generation unit 19. For example, in the data frame of the emergency data input from the relay determination unit 18, the emergency data transmission unit 20 replaces the local source address included in the ad-hoc header by the address information of the node 10. Then, the emergency data transmission unit 20 refers to the routing table 11 with as a key the global destination address included in the data header to specify the address information of an adjacent node with a high priority. Subsequently, the emergency data transmission unit 20 stores the specified address information of the adjacent node in the local destination address. After that, the emergency data transmission unit 20 increments by one the number of hops in the data header, and then transmits the emergency data.

Similarly, in the data frame of the emergency data from the emergency data generation unit 19, the emergency data transmission unit 20 refers to the routing table 11 with as a key the global destination address included in the data header to store the address information of an adjacent node with a high priority. After that, the emergency data transmission unit 20 increments by one the number of hops in the data header, and then transmits the emergency data to the adjacent node.

The data generation unit 21 is a processing unit that generates a data frame storing information on sensors connected to the node 10 and sensor measurement values. For example, the data generation unit 21 generates a data frame of normal data in which sensor measurement values are stored in the data payload. Subsequently, the data generation unit 21 sets address information of the node X to the global destination address, and address information of the node 10 to the global source address, and sets 0 to the emergency flag in the data head. After that, the data generation unit 21 stores 0 as the number of hops and the expiration date, and then outputs the generated normal data to the transmission control unit 23.

Data generation may be performed at predetermined time interval, or upon receipt of an acquisition request from the administration server, or at a timing when the sensor transmits a value to the node 10. The impetus for data generation can be set arbitrarily.

The data transmission unit 22 is a processing unit that transmits normal data or an ACK input via the transmission control unit 23 from the identifier determination unit 17 or the data generation unit 21 to the destination. The data transmission unit 22 updates the header and the like at transmission of the normal data as in the case of the emergency data transmission unit 20, and thus detailed descriptions thereof will be omitted.

The transmission control unit 23 is a processing unit that controls data transmissions such as transmissions of emergency data, normal data, and ACK response. For example, upon receipt of emergency data not relayed by the subject node, the transmission control unit 23 suppresses data transmission to each of the nodes by suppressing output of data from the transmission unit to the network for a predetermined time. Upon receipt of emergency data relayed by the subject node, the transmission control unit 23 suppresses output of data from the HELLO transmission unit 16 and the data transmission unit 22 and transmits the emergency data to be relayed from the emergency data transmission unit 20. After that, upon relay of the emergency data to be relayed, the transmission control unit 23 suppresses output of data from the emergency data transmission unit 20. Within the time during which data transmission is suppressed, the transmission control unit 23 suppresses output of data from each of the transmission units. In addition, after lapse of a predetermined time since the suppression of data transmission, the transmission control unit 23 starts output of data from each of the transmission units. During suppression of data transmission, the transmission control unit 23 may hold temporarily the data frame to be transmitted from each of the transmission units.

Flows of Processes

Subsequently, flows of processes executed by the node 10 will be described. Here, descriptions will be given as to a flow of a process on data reception from adjacent nodes, a flow of a process for data transmission to adjacent nodes, and a flow of emergency data in the network.

Data Reception Process

Figure 7:
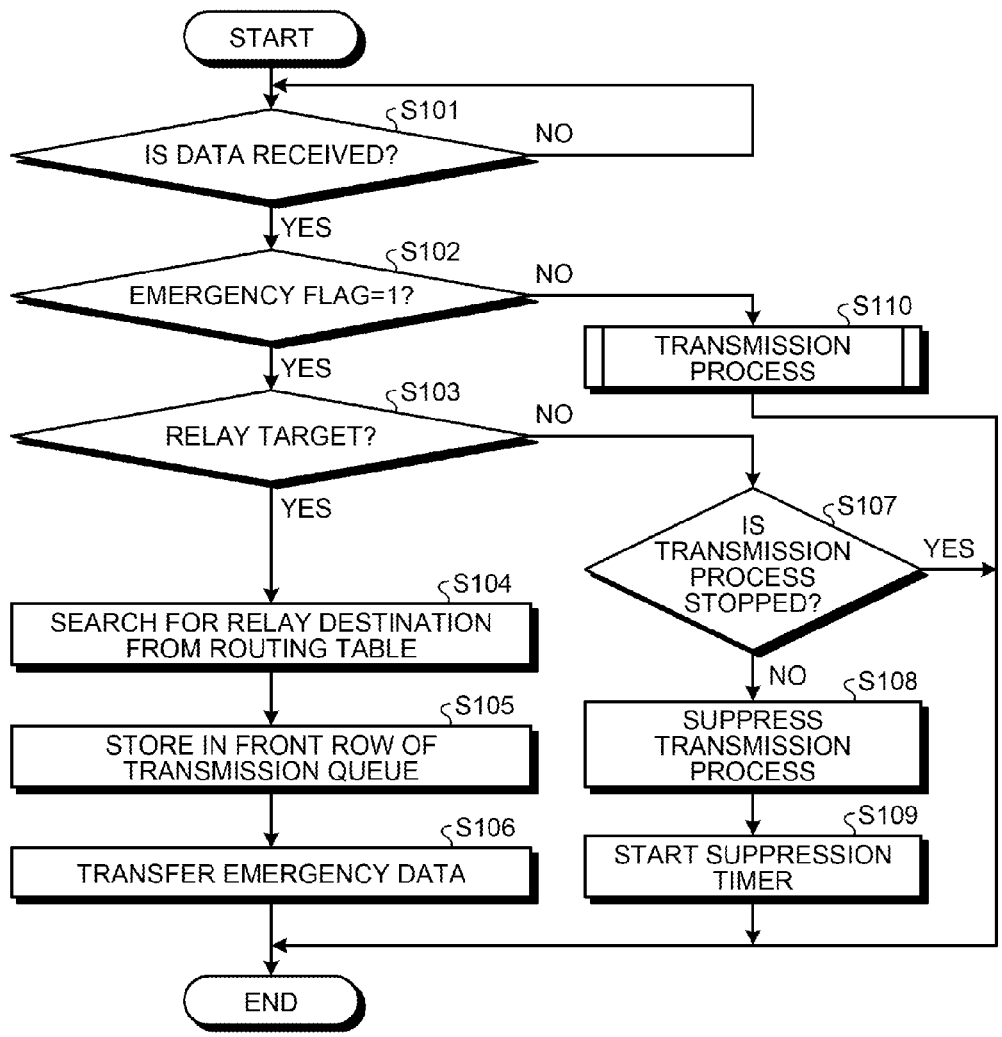
FIG. 7 is a flowchart of a process for data reception.

FIG. 7 is a flow chart of a process for data reception. As illustrated in FIG. 7, when the data reception unit 13 receives data other than a HELLO message (S101: Yes), the identifier determination unit 17 determines whether the emergency flag in the received data is set to 0 or 1 (S102).

Then, when it is determined by the identifier determination unit 17 that the emergency flag is set to (S102: Yes), the relay determination unit 18 determines whether the received emergency data is to be relayed (S103). For example, when the global destination address stored in the ad-hoc header of the received data does not match the address information of the subject node but the local destination address matches the address information of the subject node, the relay determination unit 18 determines that the emergency data is to be relayed.

Subsequently, when it is determined that the received emergency data is to be relayed (S103: Yes), the emergency data transmission unit 20 searches the routing table 11 with the destination node (GD) as a key to specify an adjacent node with highest priority as a relay destination (S104). At that time, in the ad-hoc header of the data frame in the emergency data, the emergency data transmission unit 20 replaces the local source address by the address information of the node 10, and stores the address information of the specified relay destination in the local destination address.

After that, the emergency data transmission unit 20 stores the emergency data in the front row of a transmission queue (S105), and then transmits the emergency data to the destination via the transmission control unit 23 (S106).

Meanwhile, it is determined that the received emergency data is not to be relayed (S103: No), the transmission control unit 23 determines whether the transmission process is stopped at the current point of time (S107). Then, when the transmission process is stopped (S107: Yes), the transmission control unit 23 terminates the process.

When the transmission process is not stopped (S107: No), the transmission control unit 23 suppresses output of data from each of the transmission units to the network to suppress the data transmission process at the node 10 (S108). After that, the transmission control unit 23 starts a suppression timer to count a suppression time (S109). Upon lapse of a predetermined time measured by the suppression timer, the transmission control unit 23 enables each of the transmission units to output data to the network to start the data transmission process by the node 10.

Meanwhile, when it is determined at step S102 by the identifier determination unit 17 that the emergency flag is set to 0 (S102: No), the data transmission unit 22 and the transmission control unit 23 perform the normal transmission process (S110). Specifically, the data transmission unit 22 and the transmission control unit 23 perform the process illustrated in FIG. 8.

Data Transmission Process

Figure 8:
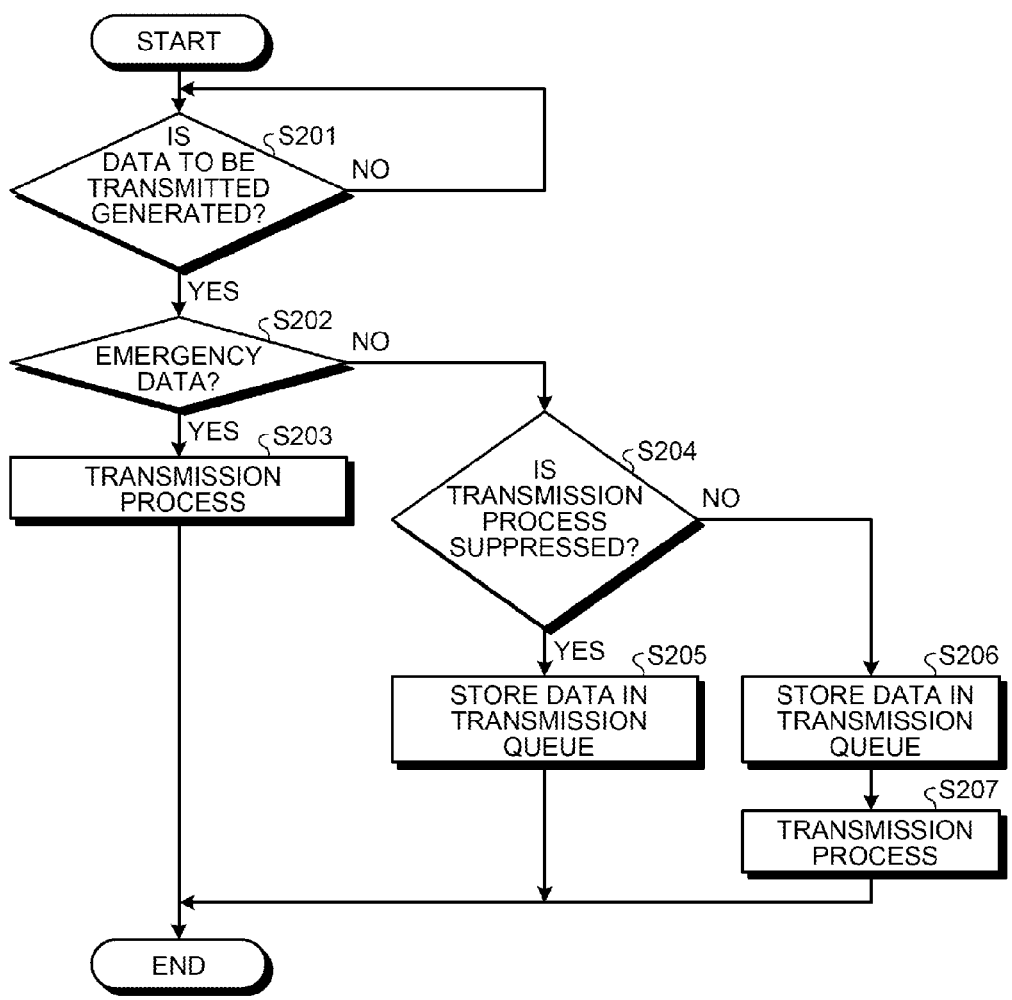
FIG. 8 is a flowchart of a process for data transmission.

FIG. 8 is a flowchart of a process for data transmission. As illustrated in FIG. 8, when data to be transmitted is generated (S201: Yes), that is, when data is input from any of the transmission units, the transmission control unit 23 determines whether the data to be transmitted is emergency data (S202).

Then, when determining that the data to be transmitted is emergency data (S202: Yes), the transmission control unit 23 stores the emergency data in the front row of a transmission queue, and transmits the emergency data to the destination (S203).

Meanwhile, when determining that the data to be transmitted is not emergency data (S202: No), the transmission control unit 23 determines whether the transmission process is suppressed at the node 10 (S204). Then, when determining that the transmission process is suppressed at the node 10 (S204: Yes), the transmission control unit 23 stores the data to be transmitted in the end of the transmission queue (S205), and then terminates the process. Upon termination of suppression of the transmission process, the transmission control unit 23 starts the transmission process to transmit the data in the front row of the transmission queue to the destination.

When determining that the transmission process is not suppressed at the node 10 (S204: No), the transmission control unit 23 stores the data to be transmitted in the end of the transmission queue (S206), and then performs the transmission process (S207).

Process Suppression Sequence with Emergency Data

Figure 9:
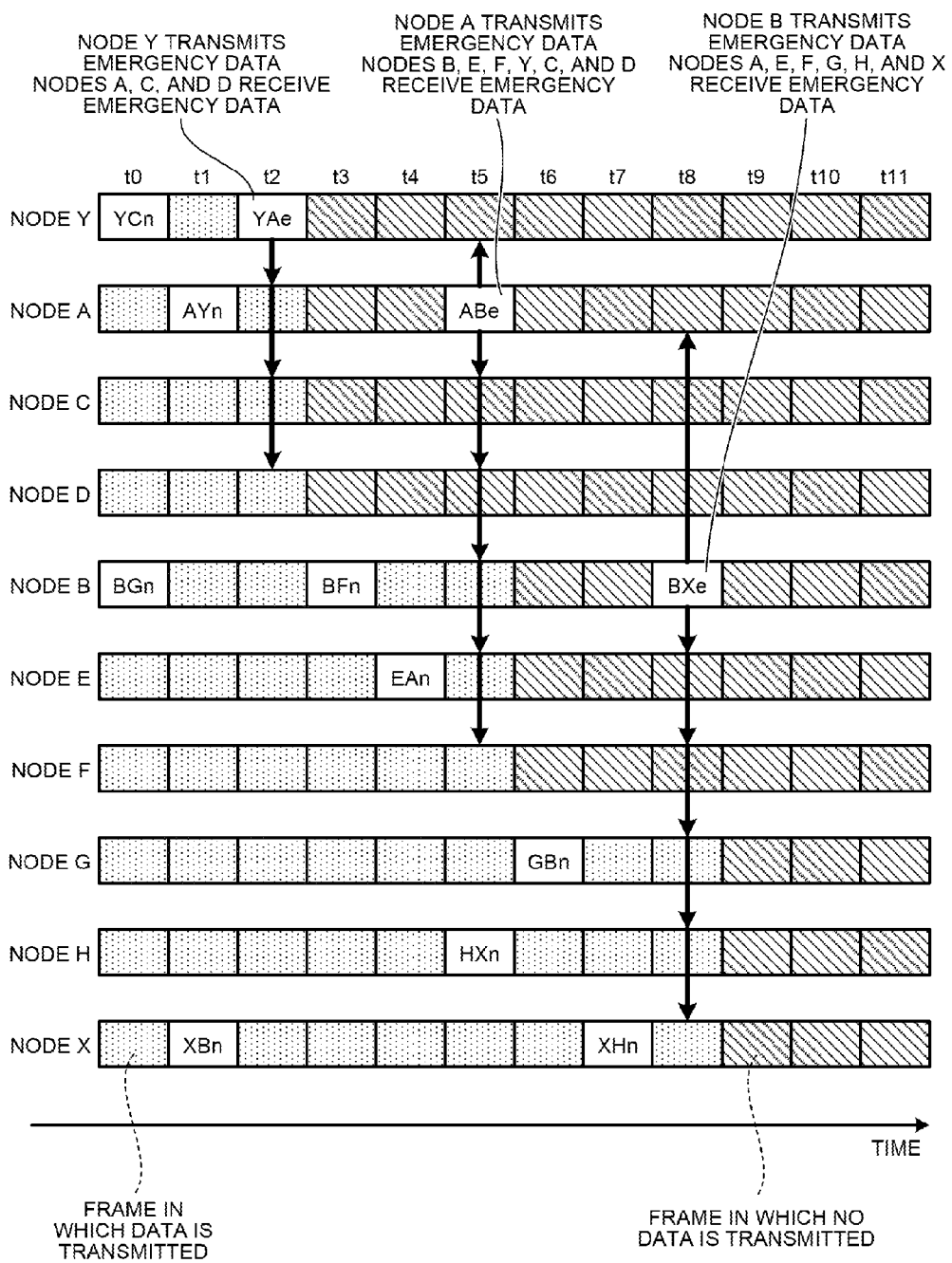
FIG. 9 is a diagram illustrating a flow of stopping a transmission process by a node having received emergency data.

FIG. 9 is a diagram illustrating a flow of stoppage of the transmission process by the node having received emergency data. In the following description, as an example, the node Y transmits emergency data to the node X in the wireless network illustrated in FIG. 1. In FIG. 9, it is assumed that data transmission/reception is carried out between adjacent nodes and the network is in a state of congestion. With regard to notations in FIG. 9, for example, transmission of normal data from the node Y to the node A is designated as "YAn," and transmission of emergency data from the node Y to the node A as "YAe."

As illustrated in FIG. 9, at time t0, the node Y transmits normal data to the node C, and the node B transmits normal data to the node G.

At time t1, the node A transmits normal data to the node Y, and the node X transmits normal data to the node B.

At time t2, the node Y transmits emergency data with the node X as the final destination and the node A as the local destination address. The emergency data is received by each of the nodes A, C, and D adjacent to the node Y.

At time t3, the node Y having transmitted the emergency data at time t2, thus suppresses data transmission such as transmissions of normal data and HELLO messages at time t3 and later. Similarly, each of the nodes A, C, and D having received the emergency data at time t2 suppresses data transmission such as transmissions of normal data and HELLO messages at time t3 and later. The nodes other than the nodes Y, A, C, and D can perform the data transmission process as usual. Specifically, at time t3, the node B transmits normal data to the node F.

At time t4, the nodes other than the nodes Y, A, C, and D can perform the data transmission process as usual. Specifically, the node E transmits normal data to the node A.

At time t5, the node A is a relay device for the emergency data received from the node Y and thus transmits the emergency data in which the local destination address is replaced by the node B. The emergency data is received by each of the nodes Y, C, D, B, E, and F adjacent to the node A. In addition, at time t5, the nodes other than the nodes Y, A, C, and D can perform the data transmission process as usual. Specifically, the node H transmits normal data to the node X.

At time t6, of the nodes having received the emergency data, each of the nodes Y, A, C, and D continues to suppress the data transmission. In addition, each of the nodes B, E, and F having newly received the emergency data suppresses data transmission at time t6 and later due to the receipt of the emergency data. The nodes other than the foregoing nodes can perform the data transmission process as usual. Specifically, at time t6, the node G transmits normal data to the node B.

At time t7, the nodes other than the nodes Y, A, C, D, B, E, and F can perform the data transmission process as usual. Specifically, the node X transmits normal data to the node H.

At time t8, the node B is a relay device for the emergency data received from the node A, and thus transmits the emergency data in which the local destination address is replaced by the node X. The emergency data is received by each of the nodes A, E, F, G, H, and X adjacent to the node B.

At time t9, the emergency node is received by all of the nodes, and thus the data transmission process for all of the nodes is suppressed. The node X having received the emergency data from the node B is equivalent to the final destination of the emergency data and thus does not execute relay of the emergency data.

Advantage

As described above, even when the network or the like has congestion, the nodes having received emergency data propagates in sequence the emergency data with highest priority according to the path information while suppressing the data transmission process. Therefore, it is possible to assure a bandwidth for transmission of the emergency data regardless of the presence or absence of congestion, and it is thus possible to prevent the emergency data from being delayed or not reaching.

[b] Second Embodiment

Each of the nodes updates the path information based on the path quality weight and the like included in the HELLO messages received from the adjacent nodes. Accordingly, the node having received the HELLO message with suppression of transmission due to the emergency data recognizes that the HELLO message is delayed, and thus updates wrongly the path information. Accordingly, in the second embodiment, descriptions will be given as to the case where the HELLO message with suppression of transmission due to the emergency data is not allowed to be applied to the update of the path information.

Figure 10:
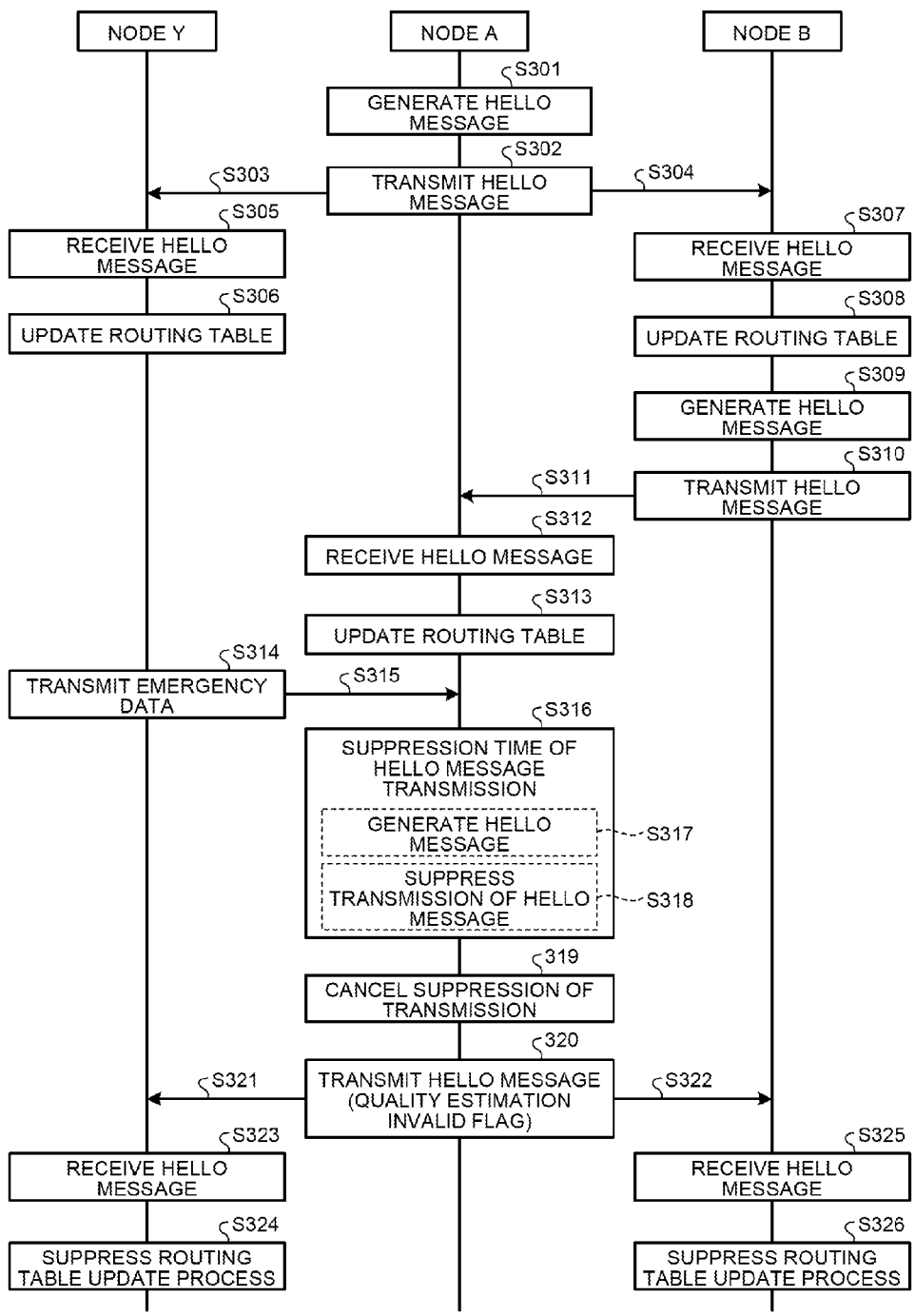
FIG. 10 is a sequence diagram illustrating transmission/reception of a HELLO message according to a second embodiment.

FIG. 10 is a sequence diagram illustrating transmission/reception of the HELLO message according to the second embodiment. In the description with reference to FIG. 10, the nodes Y, A, and B are used, and the propagation of the emergency data is the same as in the first embodiment, and thus detailed descriptions thereof will be omitted. Each of the nodes has the processing units described with reference to FIG. 3, and thus in the following description, it is assumed that each of the nodes has the same processing units and reference numerals as those illustrated in FIG. 3.

As illustrated in FIG. 10, the HELLO generation unit 15 of the node A generates a HELLO message (S301), and the HELLO transmission unit 16 transmits the HELLO message (S302 to S304).

The HELLO reception unit 12 of the node Y receives the HELLO message from the node A (S305), the table update unit 14 updates the routing table 11 according to the received HELLO message (S306). Similarly, the HELLO reception unit 12 of the node B receives the HELLO message from the node A (S307), and the table update unit 14 updates the routing table 11 according to the received HELLO message (S308).

After that, the HELLO generation unit 15 of the node B generates a HELLO message (S309), and the HELLO transmission unit 16 transmits the HELLO message (S310 and S311).

The HELLO reception unit 12 of the node A receives the HELLO message from the node B (S312), and the table update unit 14 updates the routing table 11 according to the received HELLO message (S313).

After that, the emergency data transmission unit 20 of the node Y transmits the emergency data generated at the node Y or the emergency data received from another node to the node A as an adjacent node (S314 and S315).

The transmission control unit 23 of the node A having received the emergency data suppresses transmission of data including HELLO messages for a predetermined time (S316). Even during the suppression time, the HELLO generation unit 15 of the node A generates a HELLO message on a regular basis, and thus when the generation time is reached, the HELLO generation unit 15 of the node A generates a HELLO message (S317). However, the transmission control unit 23 of the node A suppresses transmission of HELLO messages due to the suppression time of data transmission (S318).

After that, upon lapse of a predetermined time since start of the suppression, the transmission control unit 23 of the node A cancels the suppression of transmission (S319). The transmission control unit 23 of the node A transmits the HELLO message in which 1 is stored in a quality estimation invalid flag (S320 to S322).

Figure 11:
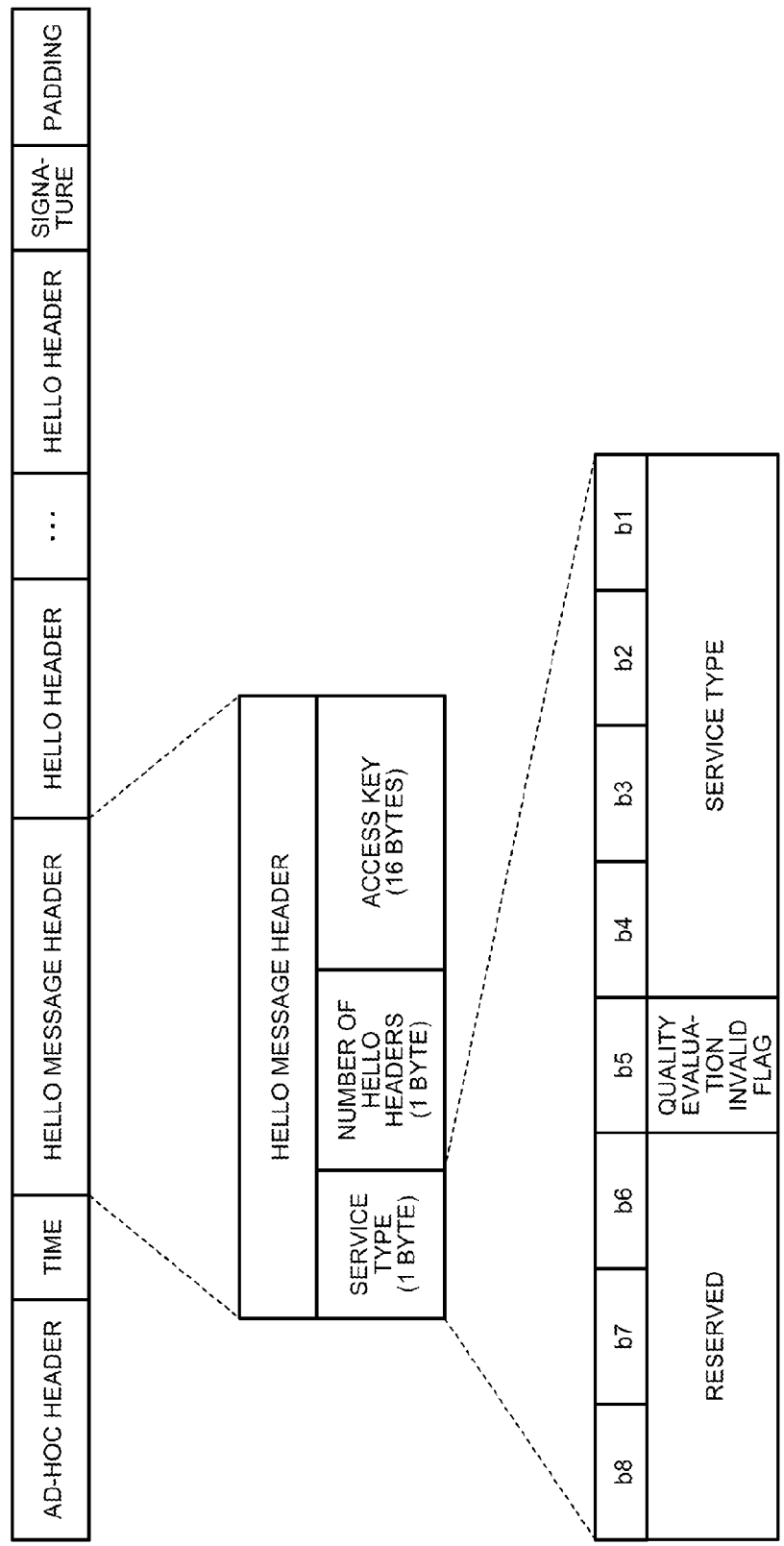
FIG. 11 is a sequence diagram illustrating a format example of the HELLO message according to the second embodiment.

Descriptions will be given as to the HELLO message and the quality estimation invalid flag. FIG. 11 is a diagram illustrating a format example of the HELLO message according to the second embodiment. As illustrated in FIG. 11, the HELLO message includes "ad-hoc header, time, HELLO message header, a plurality of HELLO headers, signature, and padding" as in the case of FIG. 5. The HELLO message here is different from the HELLO message illustrated in FIG. 5 in that 1-byte service type included in the HELLO message has a 1-bit quality estimation invalid flag. When being set to 1, the quality estimation invalid flag indicates that the message is not a target of quality estimation, whereas when being set to 0, the quality estimation invalid flag indicates that the message is a target of quality estimation. The number of 1-byte HELLO headers included in the HELLO message indicates the number of HELLO headers loaded in the HELLO message. In addition, the HELLO transmission unit 16-byte access key indicates a security key for adjacent nodes.

Returning to FIG. 10, the HELLO reception unit 12 of the node Y receives the HELLO message from the node A (S323). Then, the table update unit 14 suppresses update of the routing table 11 based on the received HELLO message because the quality estimation invalid flag in the received HELLO message is set to 1 (S324). Similarly, the HELLO reception unit 12 of the node B receives the HELLO message form the node A (S325). Then, the table update unit 14 suppresses update of the routing table 11 based on the received HELLO message because the quality estimation invalid flag in the received HELLO message is set to 1 (S326).

As described above, each of the nodes according to the second embodiment suppresses transmission of HELLO messages to transmit the emergency data. Then, upon cancellation of the suppression of the transmission process, the node stores 1 in the quality estimation invalid flag of the suppressed HELLO message, and transmits the HELLO message to the destination. Accordingly, the node having received the HELLO message can recognize that the received HELLO message is the suppressed HELLO message. Thus, it is possible to prevent that path quality is determined as being deteriorated from the HELLO message delayed due to transmission of the emergency data. Therefore, it is possible to prevent wrong update of the path information.

[Third Embodiment]

When the suppression of the transmission process due to the emergency data is cancelled, the nodes may restart concurrently data transmission, and in that case, the restart of data transmission may induce congestion. Thus, in a third embodiment, descriptions will be given as to the case where, when data transmission is restarted, after waiting for a random time, each of the nodes executes data transmission to avoid concurrent restart of data transmission and prevent induction of congestion.

Flowchart

Figure 12:
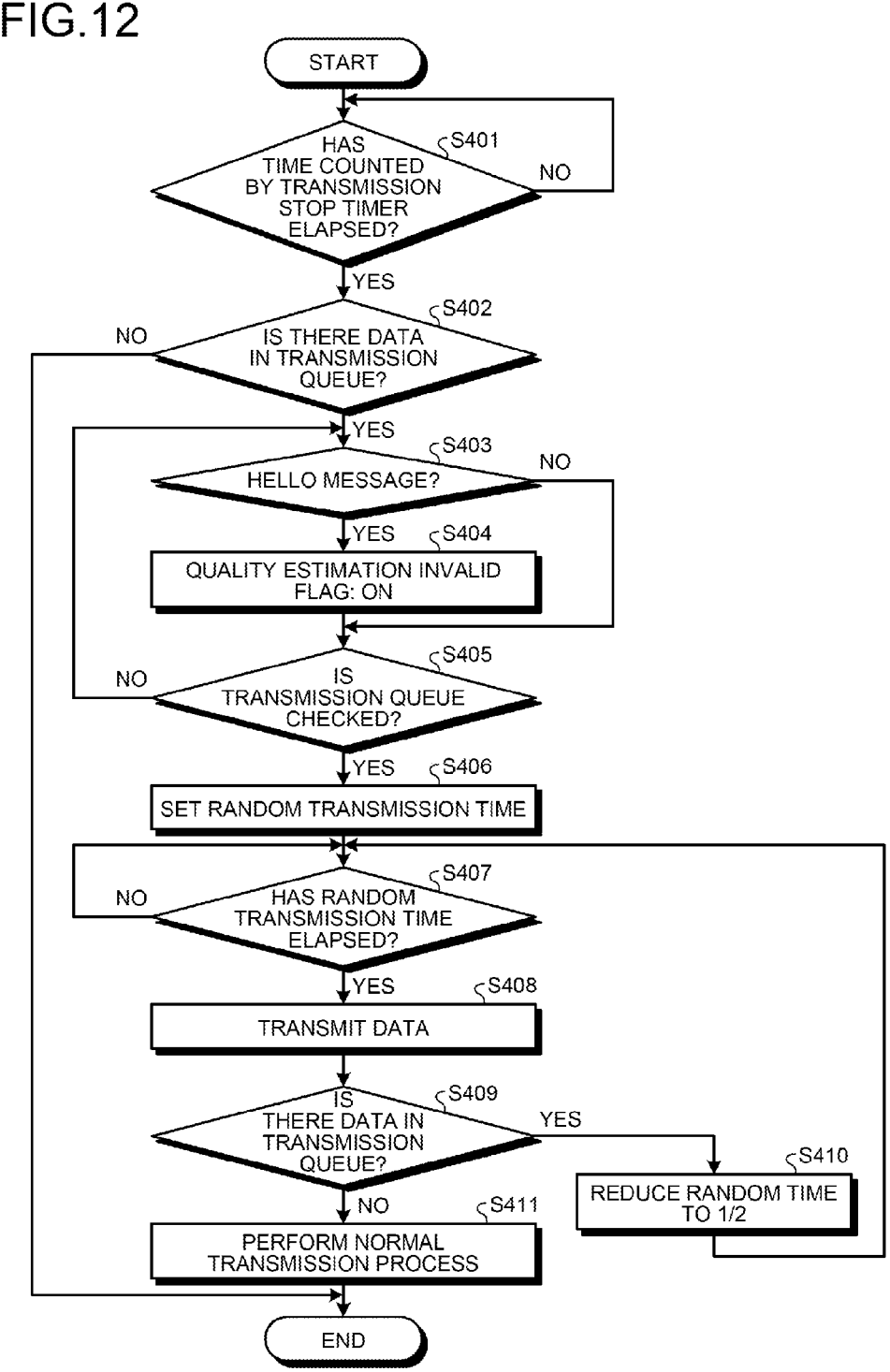
FIG. 12 is a flowchart of a process at the time of cancelling suppression of a data transmission process according to a third embodiment.

FIG. 12 is a flowchart of a process for cancellation of data transmission process according to the third embodiment. As illustrated in FIG. 12, when a timeout has occurred at the transmission suppression timer (S401: Yes), that is, upon termination of the suppression of transmission, the transmission control unit 23 determines whether there exists data in the transmission queue (S402). Then, when determining that there exists no data in the transmission queue (S402: No), the transmission control unit 23 terminates the process.

Meanwhile, when determining that there exists data in the transmission queue (S402: Yes), the transmission control unit 23 determines whether each of the data included in the transmission queue is a HELLO message (S403).

Then, as for the data determined as a HELLO message (S403: Yes), the transmission control unit 23 sets 1 to the quality estimation invalid flag in the HELLO message to enable the quality estimation invalid flag (S404), and then performs S405. Meanwhile, on the data not determined as a HELLO message (S403: No), the transmission control unit 23 performs S405 without performing S404.

After that, the transmission control unit 23 determines whether S403 and S404 are performed on each of the data included in the transmission queue (S405).

Then, when performing S403 and S404 on each of the data included in the transmission queue (S405: Yes), the transmission control unit 23 sets a random transmission time (S406). For example, the transmission control unit 23 may set the serial number of the node or the two low bytes of the MAC address as the random transmission time or may use a random value calculated by an arbitrary function or the like as the random transmission time.

After lapse of the random transmission time (S407: Yes), the transmission control unit 23 transmits beginning data in the transmission queue to the destination (S408). Then, when there still exists data in the transmission queue (S409: Yes), the transmission control unit 23 halves the random time set at S406 and sets the half time as a new random time (S410). Subsequently, after lapse of the new random transmission time (S407: Yes), the transmission control unit 23 transmits beginning data in the transmission queue to the destination (S408). After that, when there still exists data in the transmission queue (S409: Yes), the transmission control unit 23 further halves the random transmission time and repeats S407 and subsequent steps.

Meanwhile, when there is no longer data in the transmission queue (S409: No), the transmission control unit 23 shifts to the normal transmission process not using the random time (S411).

Sequence Diagram

Figure 13:
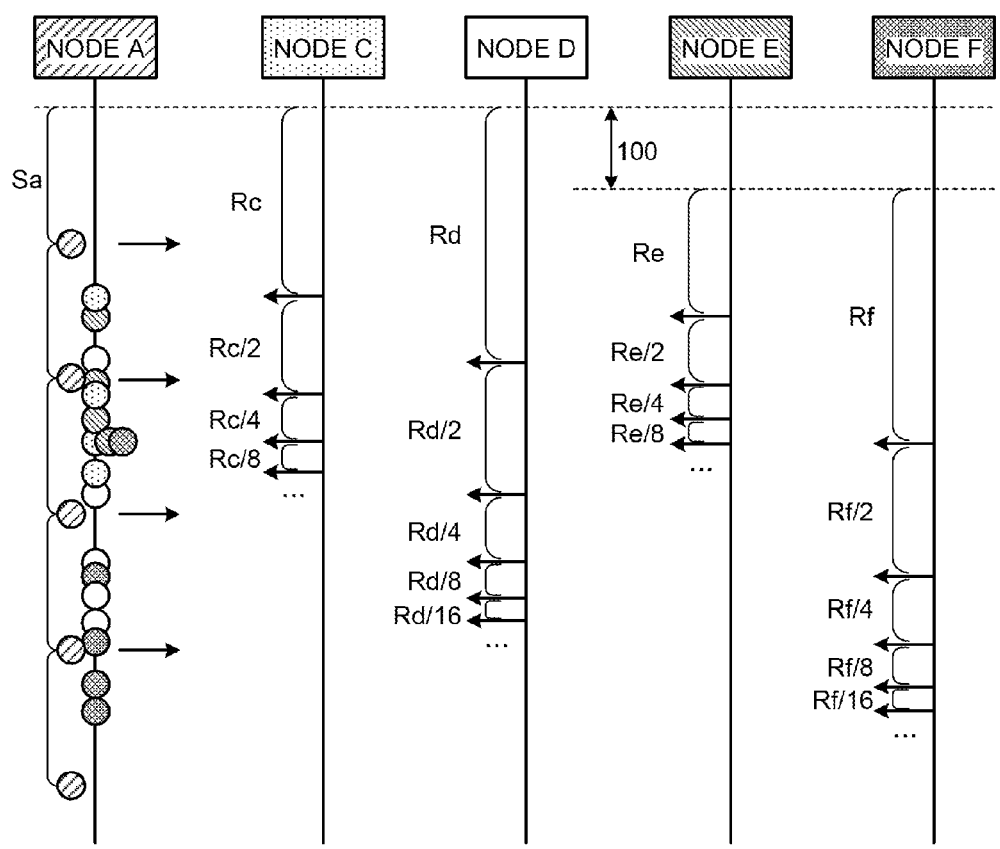
FIG. 13 is a sequence diagram illustrating a data transmission process according to the third embodiment.

FIG. 13 is a sequence diagram illustrating the data transmission process according to the third embodiment. In FIG. 13, a part of the wireless network illustrated in FIG. 1 is taken as an example. Specifically, the nodes A, C, D, and E are adjacent to one another. The nodes E and F receives data transmitted from the node A through a node positioned two hops from the node A, for example, the node C.

From the foregoing positional relationship, the cancellation time of transmission suppression of the nodes C and D relative to the node A is set to 0. In addition, the cancellation time of transmission suppression of the nodes E and F relative to the node A is set to 100. That is, the transmission suppression of the nodes A, C, and D is cancelled at the same time, and the transmission suppression of the nodes E and F is cancelled 100 seconds after the cancellation of the transmission suppression of the node A.

In addition, transmission interval of the node A is set to Sa (seconds), and random values Rc, Rd, Re, and Rf are set to the nodes C, D, E, and F, respectively.

Under the foregoing conditions, when the transmission suppression is cancelled, the node A transmits data at intervals of Sa (seconds). After lapse of the random time Rc (seconds) since the cancellation of the transmission suppression, the node C transmits beginning data in the transmission queue. Next, after lapse of Rc/2 (seconds), the node C transmits beginning data in the transmission queue. Subsequently, after each data transmission, the node C shortens the random time to Rc/4 and Rc/8.

Similarly, after lapse of the random time Rd (seconds) since the cancellation of the transmission suppression, the node D transmits beginning data in the transmission queue. Next, after lapse of Rd/2 (seconds), the node D transmits beginning data in the transmission queue. Subsequently, after each data transmission, the node D shortens the random time to Rd/4 and Rd/8.

Meanwhile, after lapse of 100 (seconds) and further lapse of the random time Re (seconds) since the cancellation of the transmission suppression, the node E transmits beginning data in the transmission queue. Next, after lapse of Re/2 (seconds), the node E transmits beginning data in the transmission queue. Subsequently, after each data transmission, the node E shortens the random time to Re/4 and Re/8.

Similarly, after lapse of 100 (seconds) and further lapse of the random time Rf (seconds) since the cancellation of the transmission suppression, the node F transmits beginning data in the transmission queue. Next, after lapse of Rf/2 (seconds), the node F transmits beginning data in the transmission queue. Subsequently, after each data transmission, the node F shortens the random time to Rf/4 and Rf/8.

Advantage

As described above, even when the transmission suppression is cancelled, each of the nodes according to the third embodiment starts data transmission after waiting for a random time. Thus, it is possible to prevent that a sharply increasing amount of data flows into one and the same wireless line. Therefore, it is possible to prevent occurrence of congestion resulting from restart of data transmission.

[d] Fourth Embodiment

Each of the nodes can receive data even during suppression of the data transmission process. In addition, the nodes have time lags in receipt of emergency data, and thus the nodes also have time lags in start of suppression of the data transmission process. Accordingly, a node executing the data transmission process may transmit data to a node under the suppression of the data transmission process.

In this case, the node as a destination has normally received the data but does not return an ACK response. Thus, the transmission source node determines that the data has not been normally transmitted, and thus repeats re-transmission of the data. Accordingly, repeated unnecessary re-transmission may cause congestion and another problem that an abnormality notification is transmitted from the transmission source node.

Thus, in a fourth embodiment described below, upon receipt of emergency data in the event of collision, a timer waiting for ACK is reset to avoid the re-transmission process.

Figure 14:
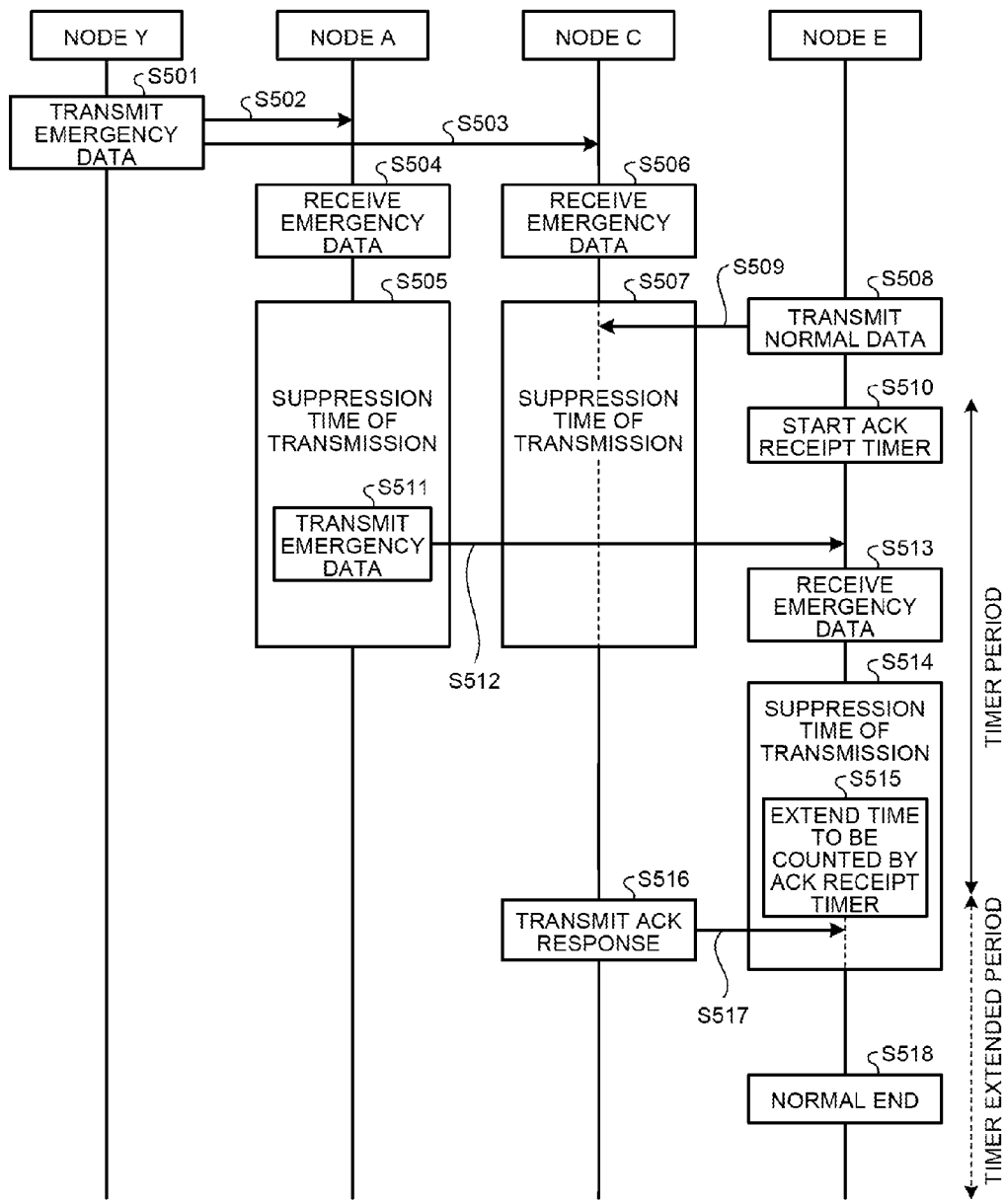
FIG. 14 is a sequence diagram illustrating a process for resetting an ACK waiting timer according to a fourth embodiment.

FIG. 14 is a sequence diagram of a process for resetting the ACK waiting timer according to the fourth embodiment. As illustrated in FIG. 14, the node Y transmits emergency data in which the address information of the node A is set to the local destination address (S501 to S503). The emergency data is received by the nodes A and C adjacent to the node Y.

The node A receives the emergency data (S504) and suppresses the data transmission process (S505). The node C receives the emergency data (S506) and suppresses the data transmission process (S507).

Meanwhile, the node E being two hops or more away from the node A transmits to the node C normal data in which the address information of the node C is set to the global destination address (S508 and S509). After that, the node E starts the ACK receipt timer (S510). Specifically, when having not received an ACK from the node C within a predetermined time, the node E performs the re-transmission process. The node C has normally received the data but does not return an ACK response due to the suppression time of the data transmission.

After that, the node A, which is a relay device for the emergency data, transmits the emergency data in which the address information of the node E is set to the local destination address and the address information of the node A is set to the local source address (S511 and S512). The emergency data is received by the node E adjacent to the node A.

Upon receipt of the emergency data (S513), the node E suppresses the data transmission process (S514). Then, the node E determines that other nodes also have suppressed the transmission process for assurance of a bandwidth for the emergency data, and sets the ACK receipt timer for an extended time for the data transmitted before transmission of the emergency data (S515).

After that, upon expiration of the transmission suppression time, the node C transmits to the node E an ACK of the data received from the node E (S516 and S517). The node E receives the ACK from the node A within the extended time set to the ACK receipt timer at 5515 even after lapse of the time set to the ACK receipt timer at 5510, and thus determines that the data has been normally received and terminates the process (S518).

As described above, in the event of collision, by resetting the ACK waiting timer upon receipt of the emergency data, it is possible to avoid occurrence of the re-transmission process. Since unnecessary re-transmission process can be avoided, it is possible to prevent unnecessary data from flowing into the network and suppress occurrence of congestion.

[Fifth Embodiment]

In the foregoing, embodiments of the present invention are described. However, the present invention can be carried out in various modes other than the foregoing embodiments. The following are descriptions of another embodiment.

Data Processing after Cancellation of Suppression

For example, when restarting data transmission after cancellation of the suppression of the data transmission process, each of the nodes may, of the data included in the transmission queue, discard normal data and transmit HELLO messages. Accordingly, it is possible to reduce the amount of data flowing in the network, which results in prevention of congestion.

System

Of the processes described above in relation to the foregoing embodiments, all or some of the processes to be automatically performed may be manually performed. Alternatively, all or some of the processes to be manually performed may be automatically performed by a publicly-known method. In addition, the processing steps, control steps, specific names, and information including various data and parameters described in the specification and the drawings can be arbitrarily modified if not otherwise specified.

The components of each unit illustrated in the drawings are only for conceptually illustrating the functions thereof and are not always physically configured as illustrated in the drawings. That is, specific modes of separation and integration of the devices are not limited to those illustrated in the drawings. Thus, all or some of the foregoing devices can be functionally or physically separated or integrated in arbitrary unit, according to various loads, use conditions, and the like. For example, the reception units can be integrated into one reception unit or the transmission units can be integrated into one transmission unit. Further, all or arbitrary ones of the processing functions performed at the devices may be realized by a CPU or programs analyzed and executed by the CPU, or may be realized as hardware by wired logic.

Hardware Configuration

Figure 15:
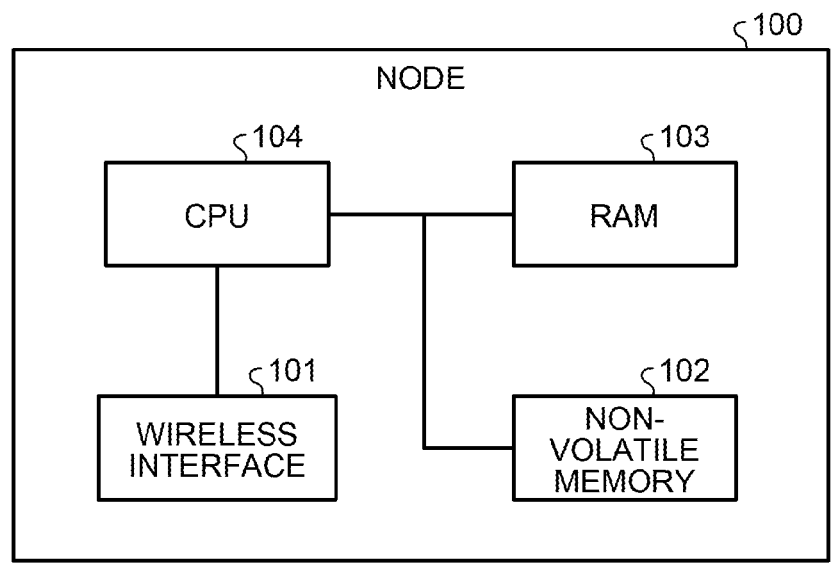
FIG. 15 is a diagram illustrating a hardware configuration example of a node.

Next, a hardware configuration of the node described above in relation to the foregoing embodiments will be described. FIG. 15 is a diagram illustrating a hardware configuration example of the node. As illustrated in FIG. 15, a node 100 includes a wireless interface 101, a non-volatile memory 102, a RAM (random access memory) 103, and a CPU (central processing unit) 104. The hardware described here is mere an example, and the node 100 may include other hardware.

The wireless interface 101 is hardware that exchanges data with other nodes, and corresponds to the HELLO reception unit 12, the data reception unit 13, the HELLO transmission unit 16, the emergency data transmission unit 20, and the data transmission unit 22 illustrated in FIG. 3. The non-volatile memory 102 is a storage device that stores various programs, device-unique IDs, and others. The RAM 103 is a storage device in which a program read from the non-volatile memory 102 by the CPU 104 is developed.

The CPU 104 is a processor that controls the entire processes performed by the node 100 such as wireless control, program control, ad-hoc protocol control, and others. The CPU 104 corresponds to the table update unit 14, the HELLO generation unit 15, the identifier determination unit 17, the relay determination unit 18, the emergency data generation unit 19, the data generation unit 21, and the transmission control unit 23 illustrated in FIG. 3. The CPU 104 can read a transmission control program from the non-volatile memory 102 and develop the same in the RAM 103 to execute the transmission control process, thereby realizing the same processes as those performed by the processing units illustrated in FIG. 3.

According to the embodiments, there is an advantage that emergency data with a higher priority can reach the destination even during congestion.

All examples and conditional language recited herein are intended for pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although the embodiments of the present invention has been described in detail, it should be understood that the various changes, substitutions, and alterations could be made hereto without departing from the spirit and scope of the invention.

What is claimed is:

1. A communication control method executed by a first node included in an ad-hoc network, the communication control method comprising:
   receiving control data for a path search including Quality information indicative of a Quality of a link between the first node and an adjacent node from the adjacent node, regularly,
   learning a higher-priority optimum path and a redundant path included in path information stored in a storage unit based on the quality information included in the regularly received control data,
   when data which is distinguished from the control data is received from a second node included in the ad-hoc network, determining whether an identifier indicative of high-priority data is included in the received data;
   when the identifier is included in the received data, determining whether the first node is a device that relays the high-priority data to a destination; and
   when it is determined that the first node is a device that relays the received data to the destination, transmitting the high-priority data to the destination and first suppressing data transmission of the control data and other data except the high-priority data, whereas when it is determined that the first node is not a device that relays the received data to the destination, second suppressing data transmission of the high-priority data, data transmission of the other data and data transmission of the control data.

2. The communication control method according to claim 1,
   wherein the learning includes, when suppression information indicating that transmission of the control data is suppressed is included in the control data, suppressing learning of the higher-priority optimum path and the redundant path using the quality information in the control data.

3. The communication control method according to claim 1, further including
   transmitting, when beginning of data included in a transmission queue is the control data after lapse of a predetermined time since suppression of the data transmission of the control data and the other data at the second suppressing, the control data with the suppression information to the destination, and
   discarding, when the beginning of the data included in the transmission queue is data other than the control data after lapse of a predetermined time since suppression of the data transmission, the beginning data of the transmission queue.

4. The communication control method according to claim 1, further including starting, when a random time allocated to the node included in the ad-hoc network has elapsed after lapse of a predetermined time since suppression of the data transmission of the control data and the other data at the second suppressing, the suppressed data transmission.

5. The communication control method according to claim 4, wherein the starting includes updating the allocated random time to a time which is shortened at a predetermined rate after the data transmission is executed.

6. The communication control method according to claim 1, further including extending, when the high-priority data is received after data other than the high-priority data is transmitted to the node included in the ad-hoc network, a time allowed between transmission of the data and receipt of a response indicative of normal receipt to a predetermined time.

7. A node, comprising:
   a memory which stores path information in an ad-hoc network including the node; and
   a processor connected to the memory, wherein the processor executes a process comprising:
   receiving control data for a path search including quality information indicative of a quality of a link between the node and an adjacent node from the adjacent node, regularly,
   learning a higher-priority optimum path and a redundant path included in the path information stored in the memory based on the quality information included in the regularly received control data,
   when data which is distinguished from the control data is received from another node included in the ad-hoc network, first determining whether an identifier indicative of high-priority data is included in the received data;
   when it is determined at the first determining that the identifier is included in the received data, second determining whether the node is a device that relays the high-priority data to a destination; and
   when it is determined at the second determining that the node is a device that relays the received data to the destination, transmitting the high-priority data to the destination and suppressing data transmission of the control data and other data except the high-priority data, whereas when it is determined at the second determining that the node is not a device that relays the received data to the destination, suppressing data transmission of the high-priority data, data transmission of the other data and data transmission of the control data.

* * * * *